J. BARRY.
TROLLEY WHEEL HOLDER.
APPLICATION FILED OCT. 18, 1907. RENEWED FEB. 20, 1909.
930,336.
Patented Aug. 10, 1909.
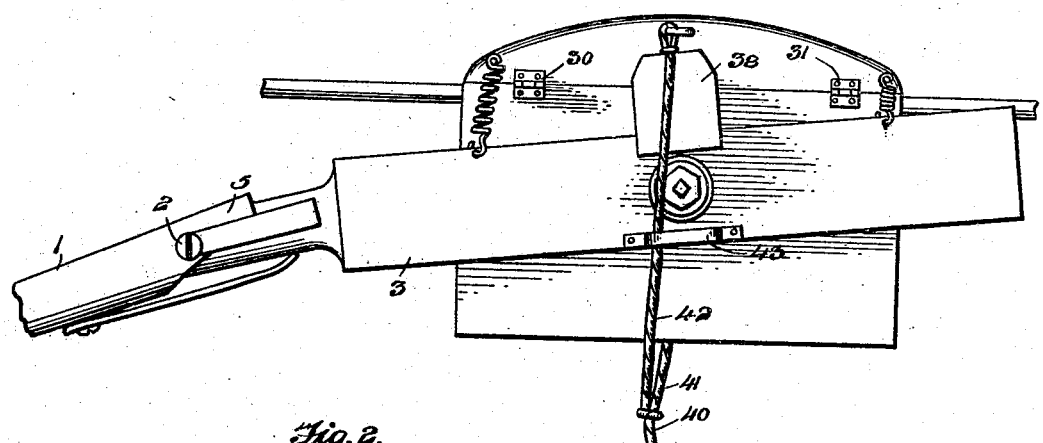
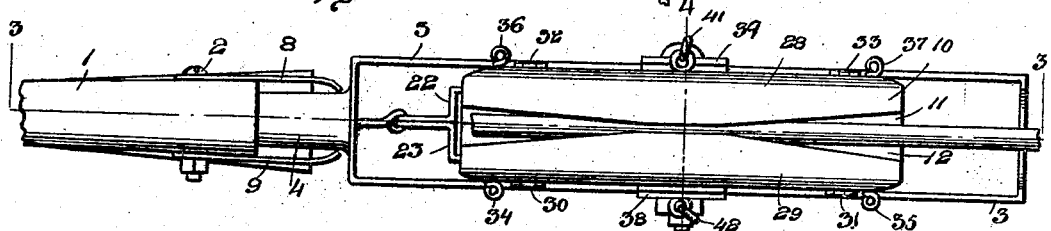
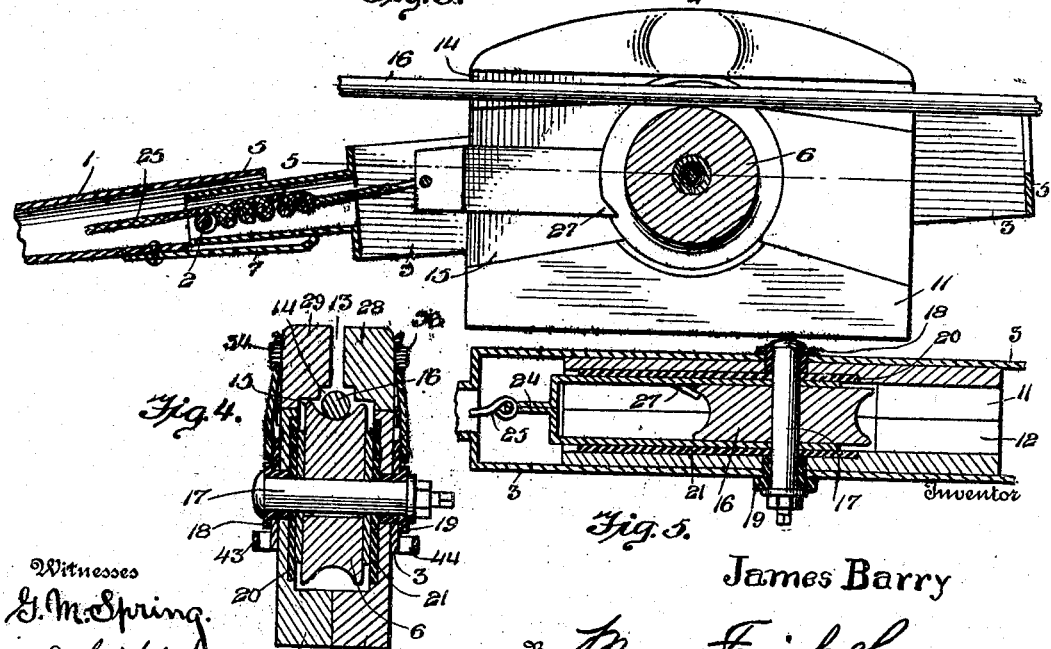
Witnesses
G. M. Spring.
A. S. Kitchin.
Inventor
James Barry
By Mason Fenwick & Lawrence
his Attorneys

UNITED STATES PATENT OFFICE.

JAMES BARRY, OF OCEAN VIEW, CALIFORNIA.

TROLLEY-WHEEL HOLDER.

No. 930,336. Specification of Letters Patent. Patented Aug. 10, 1909.

Application filed October 18, 1907, Serial No. 398,113. Renewed February 20, 1909. Serial No. 479,269.

*To all whom it may concern:*

Be it known that I, JAMES BARRY, a citizen of the United States, residing at Ocean View, in the county of San Francisco and State of California, have invented certain new and useful Improvements in Trolley-Wheel Holders; and I do hereby declare the following to be a full, clear, and exact description of the invention, such as will enable others skilled in the art to which it appertains to make and use the same.

This invention relates to improved trolley wheel holders or trolley heads and more particularly to trolley heads that are designed to have a movement independent of the trolley pole.

The invention comprises the production of a trolley head formed with a housing that is designed to have an independent pivotal movement, and mounted in a framework that is also designed to have an independent pivotal movement, the framework being pivotally mounted to the upper end of a trolley pole.

The invention further comprises the provision of means for damping and also limiting the independent pivotal movement of the housing and means secured to the trolley pole for limiting the independent movement of the framework carrying the housing.

The object of the invention is the production of a trolley head or holder that is designed to have an independent movement of its own in contradistinction to the movement of the trolley pole so as to absorb or take up any small jolting and bouncing of the trolley pole.

Another object in view is the provision of springs for holding a trolley sustaining frame in a substantially horizontal position for permitting the travel of the same along the trolley wire, in connection with a frame that is pivotally mounted in the end of a trolley pole and held in position by a plurality of springs that permits independent vertical and lateral movement to the frame and the housing carried thereby.

With these and other objects in view the invention comprises novel constructions, combinations and arrangements of parts that will be hereinafter more fully described in the claims.

In the accompanying drawings:—Figure 1 is a side elevation of a trolley head formed according to the present invention. Fig. 2 is a top plan view of Fig. 1. Fig. 3 is a section through Fig. 2 on line 3—3. Fig. 4 is a cross sectional view through section 2 on line 4—4. Fig. 5 is a horizontal sectional view through Fig. 3 on line 5—5.

In the provision of trolley heads or trolley wheel holders, catchers and the like it is very desirable to provide means for holding the trolley wheel in contact with the trolley wire at all times, regardless of the sagging or jolting of the car and trolley pole. The present invention is designed to provide means to accomplish this result, together with other desirable results, complicated mechanism and heavy construction improvements being avoided.

Referring more particularly to the drawings, 1 indicates a trolley pole to which is pivotally mounted at 2 a framework 3. The framework 3 is substantially rectangular as seen in Fig. 2 but is provided with a reduced portion 4 of a preferably conical shape, the smallest end of which is designed to receive the pivotal member 2. As seen in Figs. 1 and 3 the trolley pole 1 is cut away on the lower side so as to form an overhanging portion 5 against which member 4 rests when the trolley wheel 6 has been removed from the trolley wire. A spring 7 is provided which is securely fastened to trolley pole 1 and normally presses upward or against extension 4 of frame 3 so as to have a tendency at all times to force the frame 3 upward and trolley wheel 6 in contact with the trolley wire. Springs 8 and 9 are also secured to trolley pole 1 on opposite side of the same which are designed to normally hold frame 3 in prolongation of pole 1 but when side pressure is brought against frame 3 it will permit the same to move sidewise or laterally. When the pressure is removed the springs will automatically return frame 3 to its correct position as shown in Fig. 2. In order to permit lateral motion to frame 3 the pivotal mounting of the same at 2 is so arranged as to leave what might be termed a loose journal, by reason of the aperture passing through member 4 being considerably larger than pivotal member or pin 2. It will also be observed that member 4 is considerably smaller than the end of the trolley pole which will easily permit substantially any movement that is desired, springs 7, 8 and 9 regulating the position of the frame 3, and consequently the trolley wheel 6.

Pivotally mounted in frame 3 is a housing 10 formed in two parts 11 and 12. The parts 11 and 12 of housing 10 are designed to contact at the bottom as clearly seen in Fig. 4, but are provided with an aperture 13 at the top and cut-away portions 14 and 15 for accommodating wheel 6 and a trolley wire 16, respectively. Trolley wheel 6 is mounted upon an axle or shaft 17 which in turn passes through members 11 and 12, but is insulated therefrom by insulating washers or plugs 18 and 19 as clearly seen in Figs. 4 and 5. The members 11 and 12 of housing 10 may be made of any desired material and when not made of insulating material, insulating plugs 18 and 19 are used and in addition insulating members or washers 20 and 21 are provided that are intended to be positioned on each side of the trolley wheel, respectively. Positioned between insulating members 20 and 21 and trolley wheel 6 are metallic plates or members 22 and 23 which are designed to be brought together at 24, for having secured thereto an insulated wire 25. Insulated wire 25 is designed to pass through pole 1 down into the car in the usual manner for transmitting current to the motors of the car. Members 22 and 23 are designed to receive current from wheel 6 but in order to positively have a good contact with wheel 6 a press-out portion 27 is provided in member 22. If desired a press-out portion may be formed on member 23 as will be evident, but usually the press-out portion 27 will be sufficient.

Upon the upper edge of members 11 and 12, are positioned hinged members or doors 28 and 29, respectively, between which is arranged the slot 13. The doors are secured in position by hinges 30, 31, 32 and 33 that are normally prevented from movement by springs 34, 35, 36, 37, 38 and 39. As seen from Fig. 4 the doors or members 28 and 29 are formed with a cut-away or hollowed out portion 14 for accommodating trolley wire 16, so that if for any reason wheel 6 together with the entire head should attempt to leave the trolley wire the same will strike against doors 28 and 29 and be compelled to force the same apart. If the tendency of the trolley head to leave wire 16 is not sufficient to move doors or members 28 and 29 against the action of the springs, the trolley head of course will not leave the wire. In addition to this function the springs 34, 35, 36 and 37 of the housing 10 are designed to limit the pivotal movement of housing 10 in frame 3. In fact the springs 34, 35, 36 and 37 are principally designed for this purpose, as springs 38 and 39 which are preferably flat are provided for resisting any pressure that may have a tendency to cause the doors 28 and 29 to open.

When it is desired to move the trolley wheel from the trolley wire, rope or cable 40 is pulled in the usual manner, which acting through ropes 41 and 42 that are secured to doors 28 and 29 will first open the doors against the action of all the springs and then as the strain is continued will pull the housing 10, together with frame 3, downward until stopped by the tension of spring 7. As the strain is still continued and rope 40 is still further pulled downward spring 7 will be overcome and with its head or trolley holder will be brought down to any desired position. In this way the doors 28 and 29 are first opened for permitting a passage way for wire 16 to escape from housing 10 and then the pole is lowered. Suitable guide members or stops 43 and 44 are provided through which ropes or cables 41 and 42 pass for preventing the same from becoming tangled or displaced.

What I claim is:—

1. A device of the character described comprising a trolley pole, a pivotally mounted frame secured to said pole, means secured to said frame for holding a trolley wheel, a spring secured to said trolley pole for holding said frame in an elevated position at all times for permitting said wheel to engage a trolley wire and a spring mounted on each side of said trolley pole and engaging the side of said frame for checking any lateral movement of the same.

2. In a device of the character described, the combination with a trolley pole of a framework pivotally mounted thereon, means secured to said trolley pole for holding said frame in position, a housing pivotally mounted in said frame, means for limiting the pivotal movement of said housing, a trolley wheel mounted in said housing, means contacting therewith for permitting current therefrom to pass to the place of utilization, doors mounted on said housing above said trolley wheels for preventing the accidental removing of the same from the trolley wire, and a spring at each end of each door for holding the same in a correct position.

3. In a trolley pole head, the combination with a tubular trolley pole, of a surrounding frame having a tapered tubular head pivotally connected within said trolley pole, springs positioned on said trolley pole for controlling the alinement of said frame, a centrally positioned shaft carried by said frame, a plurality of insulating washers carried by said shaft, a conducting wheel carried on said shaft between said washers, a housing carried by said shaft comprising a pair of grooved sections, doors hinged to said housing and provided with springs connected to said frame, conducting plates embracing said conducting wheel and connected with a conducting wire, and insulating sections positioned between said conducting plates and said housing.

4. In a trolley pole head, the combination with a tubular trolley pole, of a diagonally cut away end portion and springs carried exteriorly thereon, a frame, one end of which is provided with a tapered portion pivotally inclosed within said end portion, an insulated shaft carried by said frame, a trolley wheel carried by said shaft, a sectional longitudinally grooved housing carried upon said shaft and provided with spring controlled feed-wire doors, a conducting plate embracing said trolley wheel and provided with an inwardly bent end section, insulating means positioned between said housing and said conducting plate, and means for opening said doors and disengaging said trolley wheel secured exteriorly to said doors.

5. In a trolley pole head, the combination with a tubular trolley pole having an underside cut away end portion, of a frame having a tapered tubular end section adapted to fit inside of said cut away end portion and pivotally connected thereto, springs positioned on said trolley pole engaging said tapered end section, a shaft carried by said frame, means for insulating said shaft, a trolley wheel carried by said shaft, a housing formed with grooved sections, conducting plates embracing said trolley wheels and terminating near said tapered end section, and means for insulating said trolley wheel from said housing.

6. In a trolley pole head, the combination with a tubular trolley pole having an underside cut away portion, of a tubularly ended frame pivotally connected thereto, springs for controlling the alinement of said frame, a shaft mounted within said framework, a trolley wheel mounted upon said shaft, a conducting plate embracing said trolley wheel, a grooved sectional housing, spring controlled doors hinged to said housing, means for insulating said shaft and said wheel from said housing, and means for simultaneously opening said doors and disengaging said trolley wheel.

7. In a trolley pole head, the combination with a tubular trolley pole, of a frame pivotally connected thereto, a shaft mounted upon said frame, a trolley wheel mounted on said shaft, a longitudinally grooved sectional housing, feed-wire doors hinged to said housing, spring means engaging said frame and said doors, conducting plates contacting with said trolley wheel, washer means for insulating said plates and said trolley wheel from said housing.

8. In a trolley pole head, the combination with a tubular trolley pole, of a pivotally connected frame, springs engaging said frame for controlling the alinement thereof, a shaft centrally positioned in said frame, insulating washers mounted on the ends of said shaft, a grooved sectional housing mounted on said washers, spring held doors hinged to said housing, a trolley wheel revolubly mounted on said shaft, conducting plates embracing said wheel and converging in proximity to the inner end section of said frame, and insulatting means positioned between said plate and said housing.

In testimony whereof I affix my signature in presence of two witnesses.

JAMES BARRY.

Witnesses:
EDWARD L. THOMAS,
J. M. BUCKMINSTER.